US009223867B2

(12) United States Patent
Enenkiel

(10) Patent No.: US 9,223,867 B2
(45) Date of Patent: *Dec. 29, 2015

(54) METHODS AND SYSTEMS FOR DATA PROCESSING

(75) Inventor: Achim Enenkiel, Karlsruhe (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 12/898,620

(22) Filed: Oct. 5, 2010

(65) Prior Publication Data

US 2011/0029548 A1 Feb. 3, 2011

Related U.S. Application Data

(63) Continuation of application No. 11/494,577, filed on Jul. 28, 2006, now Pat. No. 7,827,169.

(60) Provisional application No. 60/729,238, filed on Oct. 24, 2005.

(51) Int. Cl.
*G06F 17/30* (2006.01)

(52) U.S. Cl.
CPC .... G06F 17/30864 (2013.01); G06F 17/30896 (2013.01); G06F 17/30914 (2013.01)

(58) Field of Classification Search
CPC ............... G06F 17/30595; G06F 17/30902; G06F 17/30864; G06F 17/30896; G06F 17/30914
USPC .......................... 707/713, 716, 763, 766, 769
See application file for complete search history.

(56) References Cited

U.S. PATENT DOCUMENTS

| | | | |
|---|---|---|---|
| 6,721,747 B2* | 4/2004 | Lipkin | 709/209 |
| 7,315,543 B2 | 1/2008 | Takeuchi et al. | |
| 7,318,055 B2* | 1/2008 | Britton | G06F 17/30536 |
| 7,516,161 B1* | 4/2009 | Flam | |
| 7,640,239 B2* | 12/2009 | Britton | G06F 17/30424 |
| 7,890,517 B2* | 2/2011 | Angelo | G06Q 10/06 707/752 |
| 2002/0111945 A1* | 8/2002 | Young et al. | 707/9 |
| 2003/0058277 A1* | 3/2003 | Bowman-Amuah | 345/765 |
| 2003/0172082 A1* | 9/2003 | Benoit et al. | 707/101 |
| 2003/0179228 A1* | 9/2003 | Schreiber et al. | 345/738 |
| 2003/0193960 A1 | 10/2003 | Land | |
| 2004/0233916 A1* | 11/2004 | Takeuchi et al. | 370/395.54 |
| 2005/0209876 A1* | 9/2005 | Kennis et al. | 705/1 |
| 2005/0232283 A1 | 10/2005 | Moyer et al. | |
| 2005/0256866 A1* | 11/2005 | Lu et al. | 707/5 |
| 2006/0004702 A1* | 1/2006 | St. John et al. | 707/2 |
| 2006/0069694 A1* | 3/2006 | Rossi et al. | 707/101 |
| 2006/0100995 A1* | 5/2006 | Albornoz et al. | 707/3 |
| 2006/0235837 A1* | 10/2006 | Chong et al. | 707/4 |
| 2007/0041035 A1 | 2/2007 | Sembower et al. | |

OTHER PUBLICATIONS

News Clippings Services, www.journalismnet.com/choose/clippings.htm.
Peter Haase et al., "A Comparison of RDF Query Languages."
(Continued)

*Primary Examiner* — James Trujillo
*Assistant Examiner* — Fatima Mina
(74) *Attorney, Agent, or Firm* — Dilworth IP LLC

(57) ABSTRACT

Systems, methods, and computer program products are provided for data processing. In one exemplary embodiment, a method is provided that includes extracting data from a Semantic Web and processing the data with an enterprise resource planning system.

17 Claims, 5 Drawing Sheets

(56) References Cited

OTHER PUBLICATIONS

Libby Miller et al., "Three Implementations of SquishQL, a Simple RDF Query Language," http://www.hpl.hp.com/personal/afs/Papers/ISWC%202002%20-%20SquishQL.htm.

Eric Prud'Hommeaux et al., "SPARQL Query Language for RDF," W3C Working Draft, Nov. 23, 2005, http://www.w3.org/TR/2005/WD-rdf-sparql-query-20051123/.

"Semantic Web," W3C Technology and Society domain, Semantic Web Activity, www.w3.org/2001/sw/.

Dave Beckett, "Introduction to RDF Query with SPARQL," http://www.w3.org/2004/Talks/17Dec-sparql/intro/all.html.

Gabe Beged-Dov et al., "RDF Site Summary (RSS) 1.0," http://web.resource.org/rss/1.0/spec.

Frank Manola et al., "RDF Primer," W3C Recommendation Feb. 10, 2004, http://www.w3.org/TR/2004/REC-rdf-primer-20040210/.

Amin Anjomshoaa et al, Exploitation of Semantic Web Technology in ERP Systems, Research and Practical Issues o Enterprise Information Systems, Springer eBooks, 2006, pp. 417-427.

* cited by examiner

METHODS AND SYSTEMS FOR DATA PROCESSING

CROSS-REFERENCE TO RELATED APPLICATION

This is a continuation of application Ser. No. 11/494,577 (allowed), filed Jul. 28, 2006, now U.S. Pat. No. 7,827,169 which claims the benefit of U.S. provisional Application No. 60/729,238, filed Oct. 24, 2005, all of which are incorporated herein by reference.

TECHNICAL FIELD

The present invention generally relates to the field of data processing. More specifically, the invention relates to methods, systems, and computer program products for gathering information from a source, such as a data source coupled to a Semantic Web, and incorporating that information into an enterprise resource planning (ERP) system for processing.

BACKGROUND INFORMATION

The Semantic Web has been specified by the World Wide Web consortium (W3C). It provides a common framework that allows data to be shared and reused across applications, enterprises, and community boundaries. The Semantic Web is based on the resource description framework (RDF) that integrates a variety of applications using Extensible Markup Language (XML) for syntax and uniform resource identifiers (URIs) for naming.

The SPARQL query language is based on matching graph patterns. It can be used for getting information for resource description framework (RDF) graphs. The SPARQL query language for RDF has also been specified by the W3C. Other query languages for RDF are also known, such as SquishQL, RDQL, and Triple.

One application of RDF is the provision of so-called RSS-feeds. RSS is an XML application that conforms to the W3C's RDF specification and is extensible via XML-name space and/or RDF based modularization.

Further, clipping services are available on the Internet for finding recent news and for creation of user specific permanent story topics. "News Tracker" of the Excite Search engine is an example for such a clipping service.

SUMMARY OF THE INVENTION

In accordance with the present invention, methods and systems are provided for data processing. Embodiments of the invention comprise methods, systems and computer program products for data processing wherein data is extracted from a source, such as a data source coupled to a Semantic Web, and then processed by an enterprise resource planning (ERP) system.

Embodiments of the invention may enable data extraction from a Semantic Web to an ERP system for various purposes. For example, the data that has been extracted from the Semantic Web can be stored in a database of the ERP system and/or in a knowledge warehouse. This may be useful both for storing new data and updating existing data that is held by the ERP system. Further, the data that has been extracted from the Semantic Web can be used for performing a data processing operation, such as generating and/or sending a message, or as a trigger for a workflow system and/or a guided procedure.

In accordance with an embodiment of the invention, a set of data sources that comply with the RDF specification is coupled to the Semantic Web. In one embodiment, at least some of these data sources are implemented as RSS-feeds.

In accordance with another embodiment of the invention, the ERP system comprises a feed reader for extracting the data from the Semantic Web.

In accordance with another embodiment of the invention, the ERP system comprises a query component for extracting the data from the Semantic Web. For example, the query component performs RDF queries using an RDF data access query language, such as SPARQL, SquishQL, RDQL, and Triple.

In accordance with another embodiment of the invention, the data is extracted by an external extractor that forwards the extracted data to the ERP system. In one embodiment, the extractor comprises a RDF clipping service. For example, a clipping service may be implemented that regularly performs one or more predefined RDF queries for extracting data from the Semantic Web and forwarding the data that is returned by the queries to the ERP system.

Another aspect of the present invention relates to an ERP system that is operable to receive and process data extracted from a Semantic Web. In accordance with an embodiment of the invention, the ERP system is coupled to an external data extractor that performs data extraction from the Semantic Web. Alternatively, or in addition, such a data extractor forms a part of the ERP system.

Another aspect of the present invention relates to a data processing system comprising means for coupling to a Semantic Web, means for extracting data from the Semantic Web, and means for forwarding data that has been extracted from the Semantic Web to an ERP system. In accordance with an embodiment of the invention, the data processing system stores a plurality of predefined queries, such as RDF, SPARQL SquishQL, RDQL, and/or Triple queries. Each RDF query is assigned to an ERP system or to a service consumer. Each ERP system or service consumer can have a unique identifier to which the respective query is assigned. These identifiers can be used for retrieval of the queries.

In accordance with another embodiment of the invention, a query, such as a RDF, SPARQL, SquishQL, RDQL, and/or Triple query, is assigned to a topic or data source. For example, a given company X has a competitor Y and needs to obtain competitive data regarding new products of competitor Y. Hence, a topic, "information on new product releases of company Y" is defined, and a corresponding query is formulated for this topic.

Alternatively, or in addition, the company X may be interested in obtaining up-to-date information from a certain data source that is available on the Semantic Web. A query for querying the data source is defined and assigned to that data source.

In accordance with an embodiment of the invention, each query has an assigned update schedule. The schedule specifies when the respective query is to be executed. This can be at pre-programmed points of time, at regular or irregular intervals, or with a specified frequency of repetition of the query execution.

In accordance with an embodiment of the invention, an event can be detected as a result of the execution of one or more of the queries. If a query returns a certain "hit," this can trigger execution of a workflow, such as sending an e-mail to a credit manager, updating a credit rating in a database, etc.

In accordance with an embodiment of the invention, the data processing system comprises a Web services interface for forwarding data that has been extracted from the Semantic Web to the ERP system or a service consumer.

Another aspect of the present invention relates to a computer program product for execution by an ERP system comprising instructions for performing the steps of receiving data that has been extracted from a Semantic Web and processing the data for performance of an ERP function.

In accordance with an embodiment of the invention, the computer program includes instructions for extracting data from the Semantic Web. By way of example, the data extraction may be performed repetitively, at random, or regular intervals. The frequency of the repetition can be chosen in proportion to the frequency of change of the data that is to be extracted from the Semantic Web and/or in proportion to the importance of a timely detection of such a change of the data.

Another aspect of the present invention relates to a computer program product that implements an extractor for extracting data from a Semantic Web and forwarding the data to an ERP system or a service consumer.

In accordance with an embodiment of the invention, the computer program is not executed by the ERP system or service consumer itself, but by an external extractor that may be coupled to the ERP system or service consumer via a network, such as by a clipping service.

In accordance with an embodiment of the invention, the computer program comprises instructions for receiving an identifier of the ERP system or its service consumer and for using the identifier as a key in order to retrieve a predefined query for extracting the data. The identifier can be an URI or other unique identifier, such as an IP address. This identifier is also used to forward the extracted data to the respective service consumer to which the query that returned the data is assigned.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the following description, exemplary embodiments of the invention will be described in greater detail, by making reference to the drawings in which.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
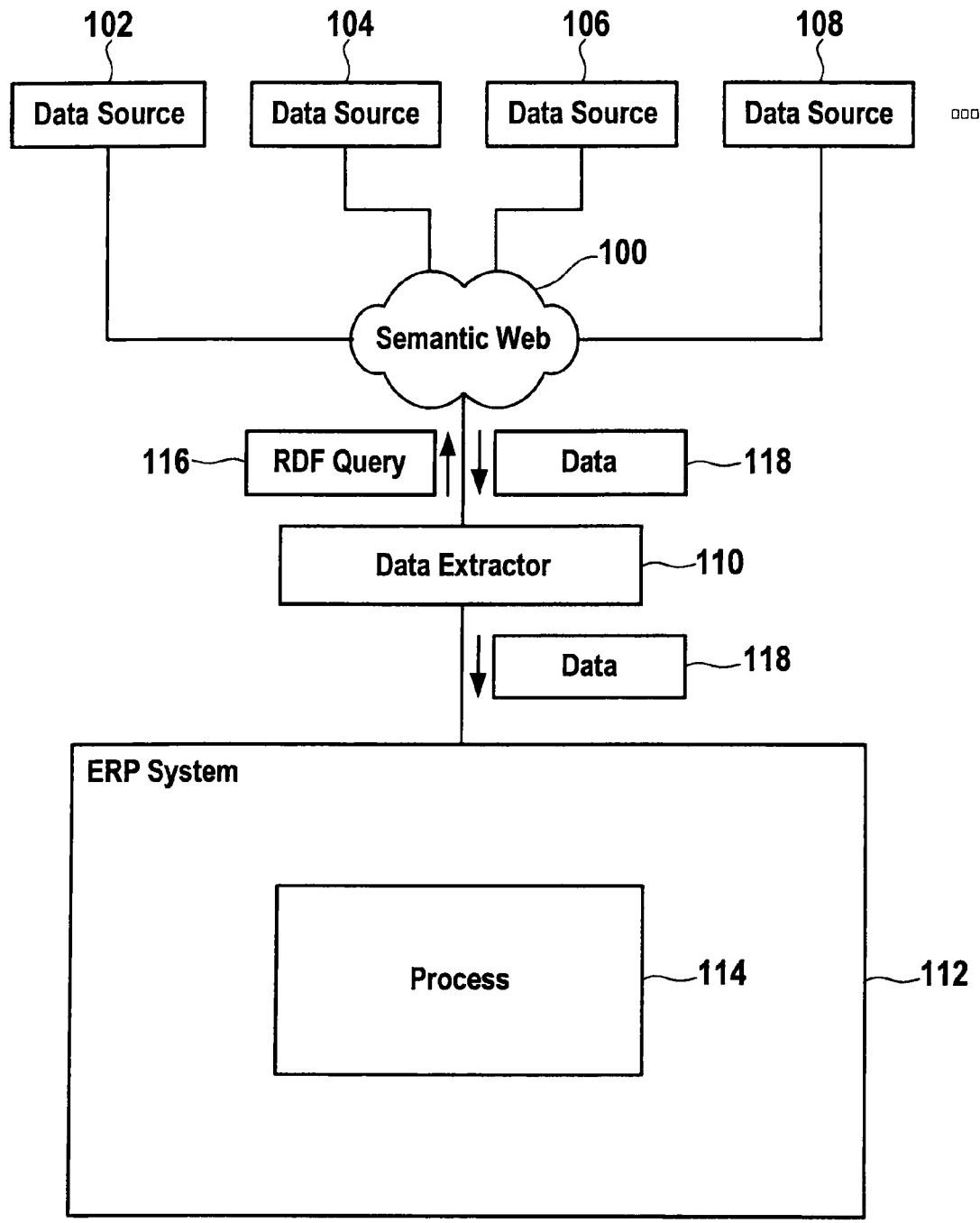
FIG. 1 illustrates a block diagram of an exemplary system environment, consistent with an embodiment of the invention.

FIG. 1 illustrates an exemplary system environment that comprises a Semantic Web 100. In the embodiment of FIG. 1, the Semantic Web 100 may be implemented as an extension of the Internet containing semantic information that is retrievable by performing a query. A number of data sources 102, 104, 106, 108, . . . are coupled to the Semantic Web 100 in the example considered here. The data sources 102, 104, 106, 108, . . . may be in compliance with a resource description framework (RDF) specification that specifies the format of the semantic information provided by the various data sources.

The technical basis of the Semantic Web 100 can be the Internet. Thus, in one embodiment, the various data sources 102, 104, 106, 108, . . . are coupled to the Internet, and the totality of these data sources constitutes the Semantic Web 100 as an extension of the Internet.

For example, the data sources 102, 104, 106, 108, . . . comply with the RDF specification, established by W3C (www.w3.org) or a similar resource description framework specification. In particular, at least some of the data sources can be in compliance with the RDF site summary (RSS) specification, which is a multi-purpose extensible meta-data description and syndication format. RSS is an XML application and conforms to the W3C's RDF specification. In particular, at least some of the data sources that are coupled to the Semantic Web 100 can be implemented as so-called RSS-feeds.

As further shown in FIG. 1, a data extractor 110 may be coupled to the Semantic Web 100. In one embodiment, the data extractor 100 is a hardware and/or software component for receiving data from the Semantic Web 100. For example, the data extractor 110 repeatedly performs one or more queries at random, periodic, and/or predefined time intervals on the Semantic Web 100 for obtaining up to date information from the Semantic Web 100 (i.e., from one or more of its data sources 102, 104, 106, 108, . . . ).

In one implementation, the RDF queries performed by the data extractor 110 are executed using a specialized query language, such as SPARQL, SquishQL, RDQL, or Triple. For example, the query language that is used by the data extractor 110 for performing the RDF queries is in compliance with the SPARQL protocol specification provided by W3C. If data is to be extracted from RSS-feeds, the data extractor 110 can be implemented as a so-called feed reader.

The data extractor 110 is also coupled to an enterprise resource planning (ERP) system 112. In general, ERP systems are integrated information systems that help enterprises better control their assets and business processes by creating adaptive systems that improve internal and external operations and enhance collaboration with constituents, customers, and suppliers. An ERP system may comprise individual modules or software applications that provide support of enterprise areas, such as financial management, human capital management, product development and manufacturing, and sales and service. One example of an ERP system is the mySAP™ ERP solution provided by SAP AG of Walldorf, Germany.

ERP system 112 may comprise various modules, such as financial, logistics, workflow management, manufacturing control modules and/or other modules, including a database and/or a knowledge warehouse. The various modules of the ERP system 112 can execute data processing operations and/or workflows and/or guided procedures. FIG. 1 shows an exemplary process 114 that can be executed by one of the modules of the ERP system 112. The exemplary process 114 is illustrated by way of example and without restriction of generality.

The data extractor 110 can be an integral part of the ERP system 112 or it can be an external component for coupling the ERP system 112 to the Semantic Web 100, as shown in FIG. 1.

In operation, the data extractor 110 performs an RDF query 116 on the Semantic Web 100. The RDF query 116 may be predefined in accordance with the information needs of the ERP system 112 and stored in the data extractor 110. In accordance with one embodiment, the query may be executed repeatedly at random, regular, and/or predefined time intervals, depending on the requirements of the ERP system 112 and the respective settings entered into the data extractor 110.

The RDF query 116 returns data 118 from the Semantic Web 100. The data extractor 110 forwards the data 118 to the ERP system 112 where it is used for the process 114. Before forwarding the data 118, the data extractor 110 can perform a data selection and/or data pre-processing operation on the data 118 in order to make it more suitable for processing by the ERP system 112 regarding content and/or format.

Figure 2:
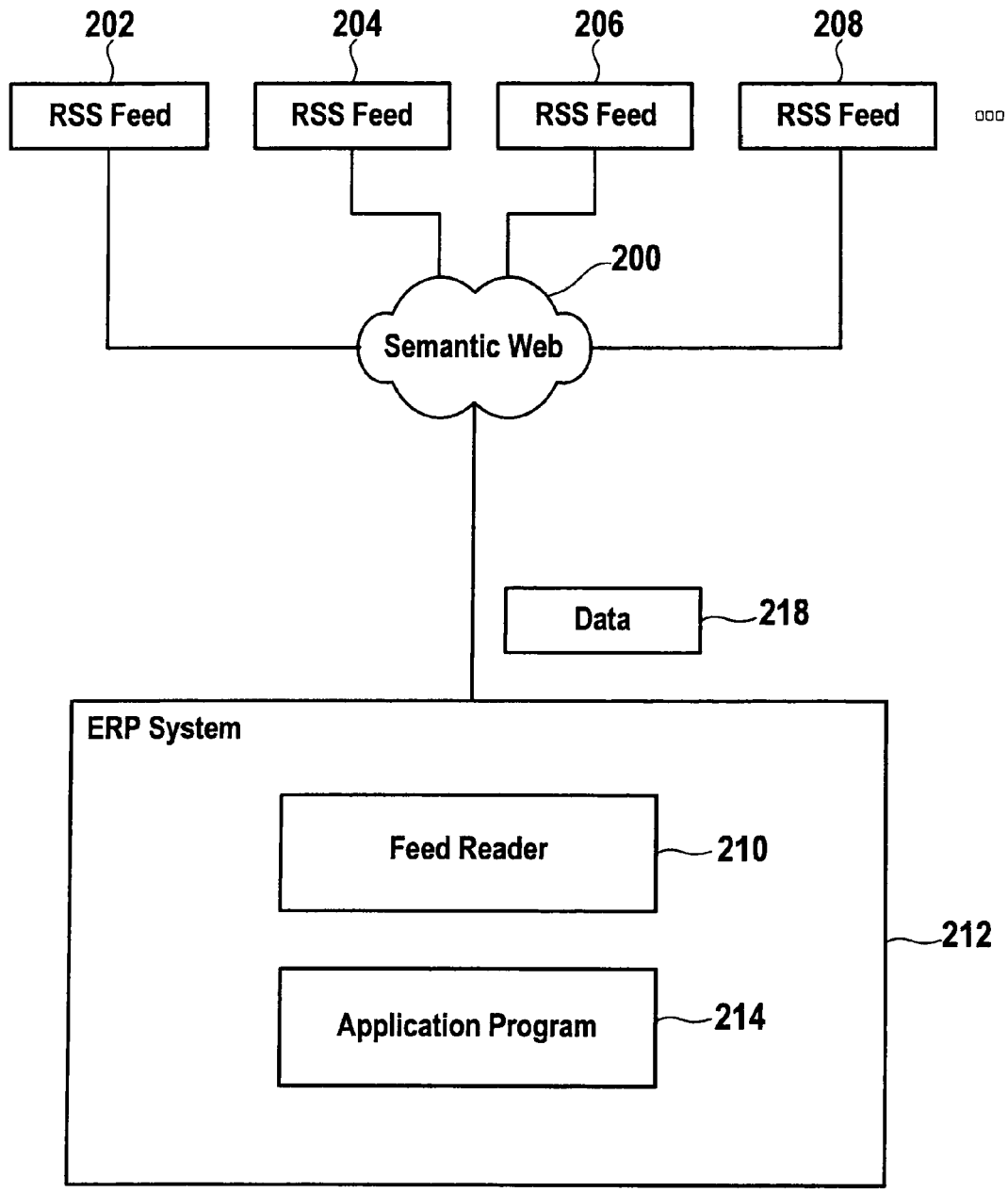
FIG. 2 illustrates a block diagram of another exemplary system environment, consistent with an embodiment of the invention.

FIG. 2 shows another exemplary system environment that includes a Semantic Web 200, where the data sources are implemented as RSS feeds 202, 204, 206, 208, . . . . In this embodiment, the data extractor is implemented as a feed reader 210 that forms a part of an ERP system 212. The feed reader 210 is coupled to an application program 214.

In operation, the feed reader 210 receives the data 218 from the Semantic Web 200. In the embodiment of FIG. 2, the feed reader 210 may provide the data 218 to the application program 214 or trigger execution of the application program 214 in response to the up-to-date data 218.

Figure 3:
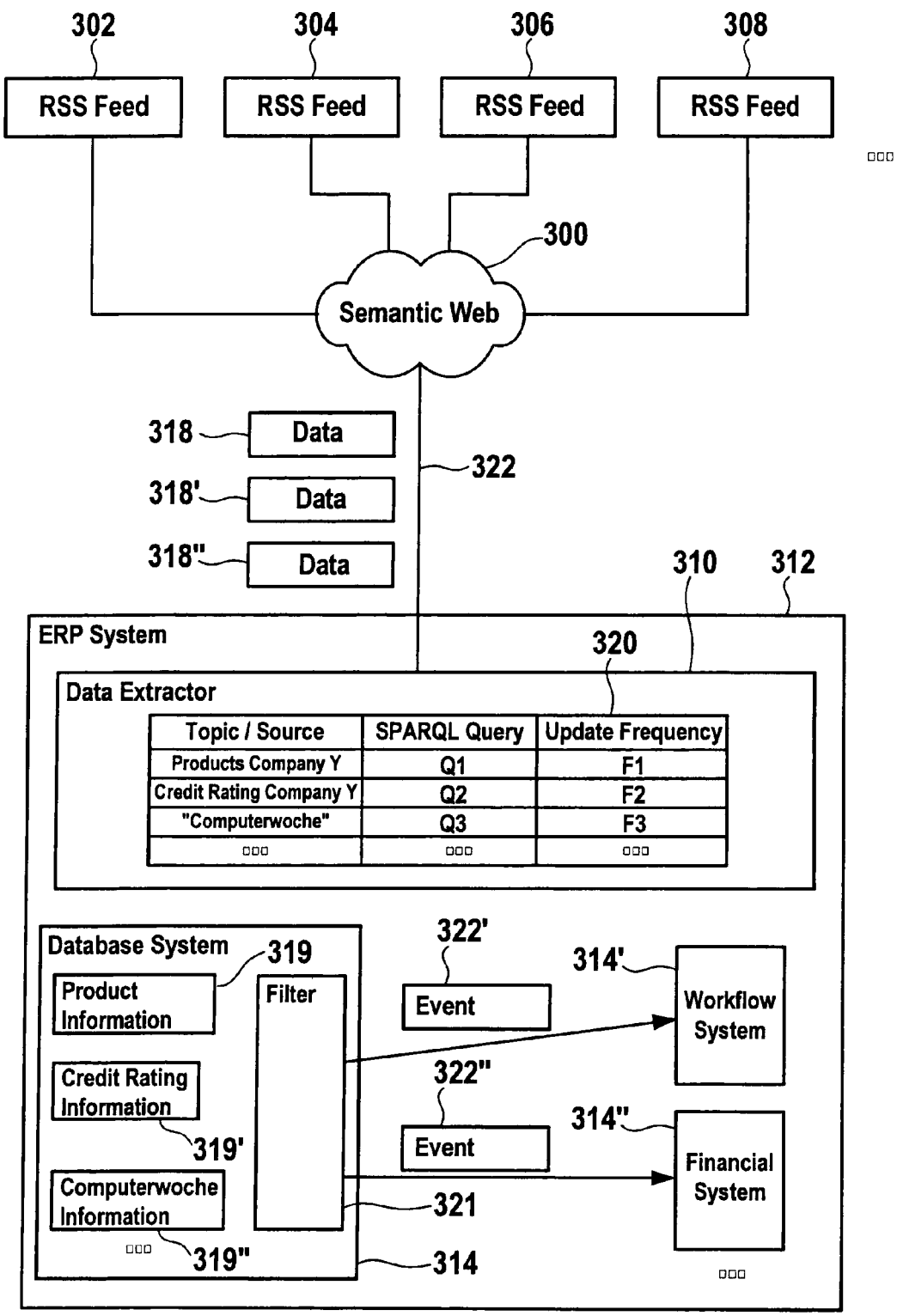
FIG. 3 illustrates a block diagram of yet another exemplary system environment, consistent with an embodiment of the invention.

FIG. 3 shows yet another exemplary system environment that includes an ERP system 312 with various service consumers, such as a database system 314, a workflow system 314', a financial system 314", and/or other service consumers. In FIG. 3, a data extractor 310 of the ERP system 312 stores a table 320. The table 320 contains predefined queries for querying the Semantic Web 300, such as SPARQL queries Q1, Q2, Q3, . . . .

A topic or data source and an update frequency can be assigned to each of the queries Q1, Q2, Q3, . . . . For example, an RDF query Q1 is assigned to the topic "Products of Company Y," an RDF query Q2 to the topic "Credit Rating of Company Y," an RDF query Q3 to the data source "Computerwoche," etc. In one embodiment, the queries Q1, Q2, Q3 may be formulated using the SPARQL format.

As shown in FIG. 3, the update frequency of table 320 specifies the periodicity with which a given query is to be performed (i.e., the time interval between consecutive RDF queries). For example, the frequency with which the query Q1 is to be repeated is the frequency F1, the update frequency for Q2 is F2 and the update frequency for Q3 is F3, etc.

One advantage to specifying an update frequency for each query is that the frequency with which a query is performed repetitively can be chosen in proportion to the frequency of change of the respective data on the Semantic Web 300 and/or in proportion to the importance of a timely detection of such a change to the respective service consumer of the ERP system 312. This has the technical advantage that the data processing resources required for the data extractor 310 can be minimized and that the available bandwidth of the communication channel 322 that links the ERP system 312 with the Semantic Web 300 can be used efficiently.

In operation, the data extractor 310 executes the predefined RDF queries Q1, Q2, Q3 with the respective update frequencies F1, F2, F3, . . . . When query Q1 is executed this may return data 318 from the Semantic Web 300 containing new information on products of Company Y, such as a recent product announcement or product release that is advertised on the Semantic Web 300. The data 318 is forwarded by the data extractor 310 to the database system 314 for storage in the database table 319 that holds product information.

Likewise, data 318' may be returned in response to execution of the query Q2. The data 318' may contain up-to-date information that can impact the credit rating of the company Y. If data 318' is returned in response to query Q2, this data is stored, for example, in the respective database table 319' of the database system 314.

The query Q3 is assigned to the RSS feed that is provided by the "Computerwoche" magazine on the Internet. The RSS feed contains information that can be of interest for various groups of computer users. Data 318" that may be returned from the Semantic Web 300 in response to query Q3 is stored, for example, in database table 319".

The database system 314 has a filter 321 that is invoked when data 318, 318', or 318", . . . is entered into the respective database table 319, 319', 319", . . . . In response, an event message 322' or 322" is sent to the service consumer to which the new data may be of interest.

For example, if the data 318' is returned, the event message 322' is sent from the filter 321 to the workflow system 314' in order to trigger the execution of a workflow. For example, an e-mail message may be generated automatically in order to inform a credit manager of the data 318'. Likewise, a respective event message 322" can be generated and sent to the financial system 314" for adapting the terms of payment for company Y in view of the data 318'.

The source or sources that have returned the information that lead to the generation of the event message 322' and/or 322" can be saved, for example, in the database system 314 and/or in an XML repository of the ERP system 312 (e.g., by saving a link to the respective RDF feed or feeds). This can be useful to fulfill regulatory requirements in certain countries regarding a companies credit rating. For example, it may be necessary to provide a justification for a change of a companies credit rating, such as a report on financial difficulties of that company. Thus, it may be useful to store the source or the sources of the Semantic Web 300 that delivered the respective information regarding the financial difficulties and that lead to the generation of an event message for adaptation of the credit rating for later justification of the adaptation and for fulfillment of the respective regulatory requirements, if any.

Figure 4:
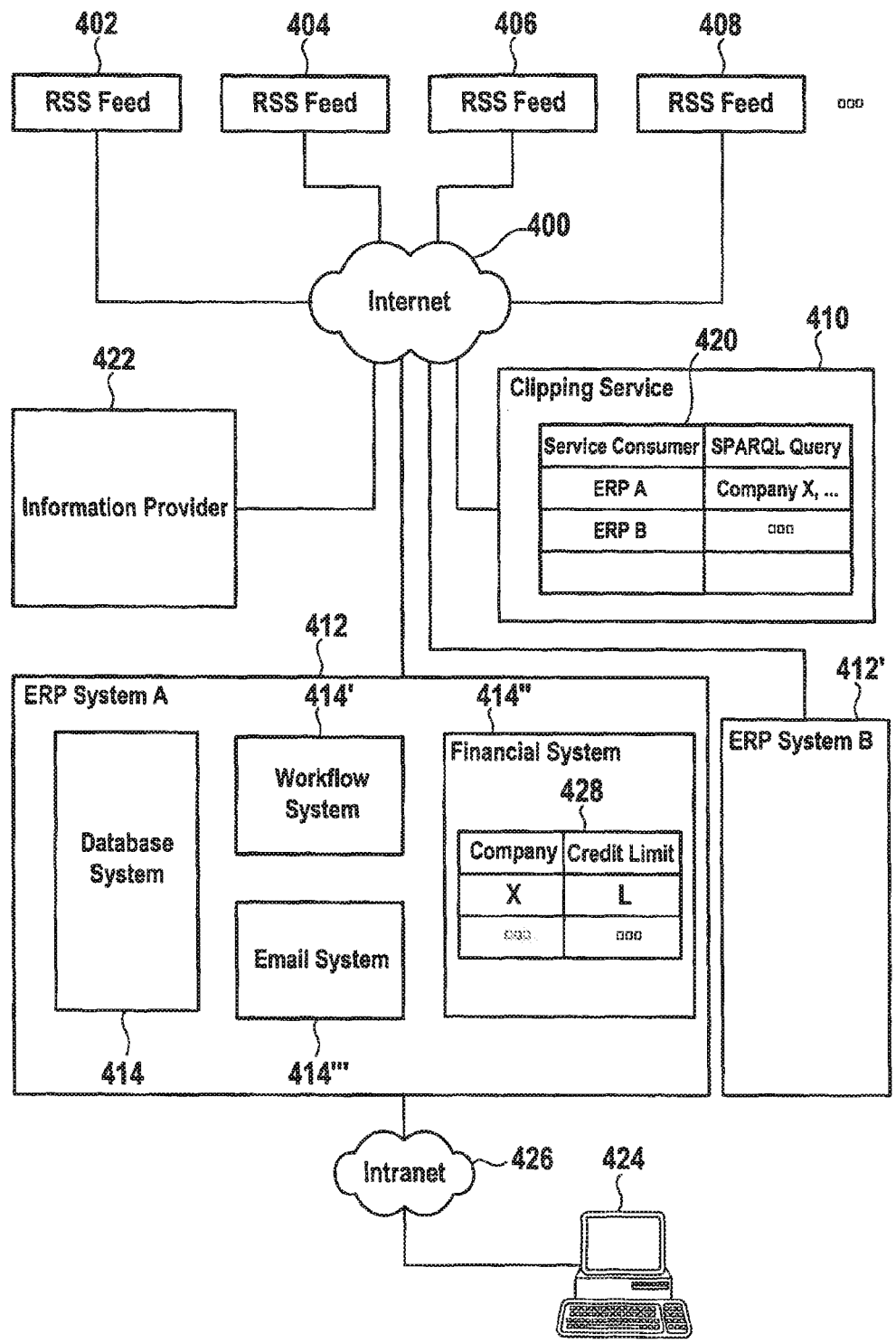
FIG. 4 illustrates a block diagram of still another exemplary system environment, consistent with an embodiment of the invention.

In the embodiment of FIG. 4, the data extractor is implemented by a clipping service 410. As shown in FIG. 4, the clipping service 410 is coupled to the Internet 400. It can include a table 420 that is similar to the table 320 of the embodiment of FIG. 3. In the embodiment considered here, the table 420 can contain service consumers including different ERP systems and/or service consumers of different ERP systems, such as ERP system A 412 and ERP system B 412'.

The clipping service 410, the ERP system A 412 and the ERP system B 412', as well as other service consumers not shown in FIG. 4 may be coupled to the Internet 400, which provides the technical basis for the Semantic Web constituted by a plurality of RSS feeds 402, 404, 406, 408, ... that are also coupled to the Internet 400.

Further, an information provider 422 is coupled to the Internet 400. The information provider 422 can be a database service, such as for providing technical information, financial information, stock market information, credit rating information, product information, product availability information, logistics information, etc.

In the example of FIG. 4, the ERP system A 412 is coupled to a plurality of client computers, including client computer 424, via an intranet 426. The financial system 414" of the ERP system A stores a table 428 that contains companies and their respective credit limits, such as customers of the company that runs the ERP system A 412 and their respective credit limits. For example, the customer X has a current credit limit of L.

The table 420 of the clipping service 410 contains a respective SPARQL query for the financial system 414" of the ERP system A 412. By an execution of the SPARQL query assigned to the financial system 414" in the table 420, the Semantic Web is checked for new information regarding the company X that is relevant for its credit rating. If such new information is returned by the query, it is forwarded by the clipping service 410 to the ERP system A 412 and more specifically to its financial system 414".

If the data returned by the query is in fact indicating that the credit limit L might need to be changed, the financial system 414" can send a request to the information provider 422 via the Internet 400 in order to obtain additional up to date credit rating information. On the basis of the data returned by the query and the information provided by the information provider 422, the financial system 414" can update the credit limit L in the table 428. Before the credit limit L is updated, the workflow system 414' is triggered in order to generate an e-mail message and send the e-mail message using e-mail system 414''' to a credit rating manager of the company that runs the ERP system A 412.

The credit rating manager receives the e-mail message containing the data returned by the SPARQL query and the information provided by the information provider 422, as well as a suggestion for an updated credit limit L'. Upon approval of the credit rating manager, the suggested new credit limit L' is stored in the table 428 as a replacement of the former credit limit L.

The above described scenario is particularly advantageous for improving the risk management of a company. In enterprise risk management, a risk is treated as a possible event or circumstance that might have a negative influence on the enterprise, a customer, or a certain project. The risk management of customers and vendors handles risk, demographic, and socio-economic information about business partners to protect an enterprise against critical changes and events happening to its customers, suppliers, and prospects. This information can warn an enterprise about situations that can impact business and enable the enterprise to take appropriate action. This may include the detection of business partners that display signs of fraud, have been indicted, have been declared bankrupt, show signs of financial distress, and/or operating difficulty.

The information may be maintained and acquired by information provider 422, such as information offices or credit reference agencies, but it is sometimes not up to date and/or expensive to obtain. The acquisition of publicly available information may be performed by the simultaneous and periodic monitoring of financial newspapers or stock market reports delivered by RSS feeds. Automatic processing requires the definition of information sources and RDF queries that might be specific to a certain business partner and that can be suitably filtered for specific and generic content.

For example, the query assigned to the financial system 414" of ERP System A 412 may specify that all information about the customer "X company" is to be retrieved from newspapers specific to the chemical industry and stock market reports that contain any information with the keywords "X company" and "Difficulties."

The Clipping Service 410 will trigger events or messages that might be linked to guided procedure and/or workflows in the ERP system. This may include sending a message or mail to the credit manager, requesting new data from a credit reference agency, or determining a new scoring value and recalculating the current credit limit of the business partner concerned.

In the following, an example of an incoming RSS document is given. The RSS document in this example is to be stored in the content management system of the ERP system A 412, that is, database system 414.

```
Incoming RSS document
<channel>
    <link>http://money.cnn.com</link>
    <item>
        <title>X Company in Financial Difficulties</title>
        <link>http://money.cnn.comfortune/news13.html</link>
        <description>Slow sales and unexpected expenses ...
        </description>
        <date>Fri, 18 Nov 2005 14:05:00 GMT</date>
    </item>
</channel>
```

In the following, an example of the RTF Query executed by the clipping service for finding relevant news on X Company is given.

```
Clipping Service
SELECT
    ?title ?link ?description ?date
WHERE
    (?title rss:title %"X Company & difficult*"%)
```

If the query returns data, this may trigger a workflow and/or process such as sending an e-mail containing title, description, source, and date of the returned RSS document to the responsible credit manager and/or to the key account manager of "X Company." The credit limit L is temporarily set to zero, in one embodiment.

Another example is the monitoring of changes of legal requirement. Changes to legal requirements in a country are normally published in legal publications such as official gazettes. If these publishing media are made available as Syndication Content, it is easy to detect the type of legal change. After a legal change, such as a change of a tax rate has been detected, an enterprise can ensure that the necessary steps are taken to change the customizing data of the ERP system.

Figure 5:
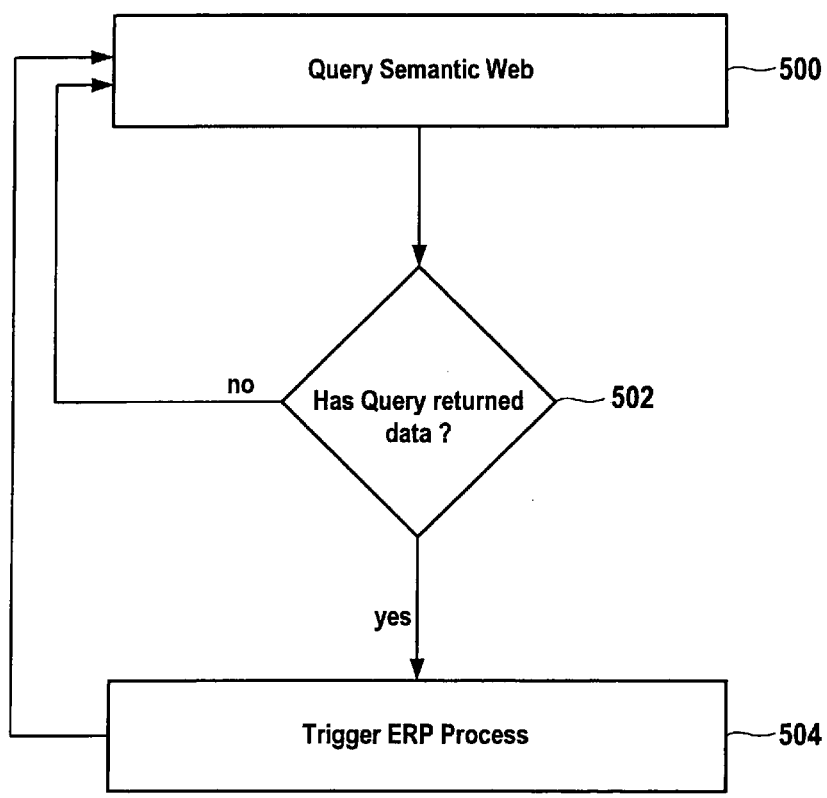
FIG. 5 illustrates a flowchart of an exemplary method for gathering data from a Semantic Web, consistent with an embodiment of the invention.

FIG. 5 illustrates a flowchart of an exemplary method for gathering data from a Semantic Web. In step 500, a Semantic Web is queried. The query may be performed by an ERP system or by an external data extractor, such as a clipping service that is closely or loosely coupled to the ERP system.

In step 502, it is determined whether the query has returned at least one "hit," for example, at least one RSS document. If a hit is not returned, the control goes back to step 500 in order to perform the query again. If a hit is returned, the control goes to step 504 in order to trigger a process of the ERP system using the returned data, such as a guided procedure, a workflow, and/or a data processing operation. From there the control goes back to step 500 in order to perform the query again.

The foregoing description has been presented for purposes of illustration. It is not exhaustive and does not limit the invention to the precise forms or embodiments disclosed herein. Modifications and adaptations of the invention will be apparent to those skilled in the art from consideration of the specification and practice of the disclosed embodiments of the invention.

Further, the described implementations include software, but systems and methods consistent with the present invention may be implemented as a combination of hardware and software or in hardware alone. Examples of hardware include computing or processing systems, including personal computers, servers, laptops, mainframes, micro-processors, and the like. Additionally, although aspects of the invention are described for being stored in memory, one skilled in the art will appreciate that these aspects may also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules may be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules may be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing method, comprising:
   receiving, at a data extractor, information identifying an enterprise resource planning system, the identification information comprising an identifier of the enterprise resource planning system;
   selecting, from a table of the data extractor, one or more predefined resource description framework queries, the selecting being based on a resource description framework specification compliant data source linked to a Semantic Web and on a key comprising the received identification information;
   querying, by the data extractor, the resource description framework specification compliant data source to extract data by executing one or more of the selected predefined resource description framework queries, wherein the one or more selected predefined resource description framework queries have an assigned repetition frequency based on the frequency of change of data to be extracted from the data source or an importance of a timely detection of a change of the data to be extracted from the resource description framework specification compliant data source; and
   processing the extracted data by the enterprise resource planning system, comprising:
      determining whether the extracted data includes new data that is of interest to one or more service consumers; and
      responsive to determining whether the extracted data includes new data that is of interest to the one or more service consumers, sending an event message alerting the one or more service consumers of the new data.

2. The data processing method of claim 1, wherein the data from the Semantic Web is Extensible Markup Language data.

3. The data processing method of claim 1, wherein at least one of the predefined resource description framework queries is performed using a resource description framework data access query language.

4. The data processing method of claim 3, wherein at least one of SPARQL Protocol and Resource Description Framework Query Language, SquishQL, Resource Description Framework Data Query Language, or Triple is used as the resource description framework data access query language.

5. The data processing method of claim 1, wherein the enterprise resource planning system comprises:
   a workflow system for performing the data processing operation.

6. The data processing method of claim 1 wherein a first type of data source comprises a Really Simple Syndication feed.

7. A computer-implemented data processing system comprising:
   a processor; and
   a storage unit for storing a set of instructions for execution by the processor, the set of instructions including:
      instructions for receiving, at a data extractor, information identifying an enterprise resource planning system, the identification information comprising an identifier of the enterprise resource planning system;
      instructions for selecting, from a table of the data extractor, one or more predefined resource description framework (RDF) queries,
         the selecting being based on a resource description framework specification compliant data source linked to a Semantic Web and on a key comprising the received identification information;
      instructions for querying, by the data extractor, the resource description framework specification compliant data source to extract data by executing one or more of the selected predefined resource description framework queries, wherein the one or more selected predefined resource description framework queries have an assigned repetition frequency based on the frequency of change of data to be extracted from the data source or an importance of a timely detection of a change of the data to be extracted from the resource description framework specification compliant data source; and instructions for processing the extracted data by the enterprise resource planning system, the instructions comprising:

instructions for determining whether the extracted data includes new data that is of interest to one or more service consumers; and instructions for, responsive to determining whether the extracted data includes new data that is of interest to the one or more service consumers sending an event message alerting the one or more service consumers of the new data.

8. The data processing system of claim 7, wherein each query has an assigned schedule of repetition.

9. The data processing system of claim 7, wherein the data from the Semantic Web is Extensible Markup Language data.

10. The data processing system of claim 7, wherein at least one of the predefined resource description framework queries is performed using an resource description framework data access query language.

11. The data processing system of claim 7, wherein the enterprise resource planning system comprises:

a workflow system for performing the data processing operation.

12. A tangibly embodied non-transitory computer-readable storage medium including program instructions for performing, when executed by a processor, a method comprising:

receiving, at a data extractor, information identifying an enterprise resource planning system, the identification information comprising an identifier of the enterprise resource planning system;

selecting, from a table of the data extractor, one or more predefined resource description framework queries, the selecting being based on a resource description framework specification compliant data source linked to a Semantic Web and on a key comprising the received identification information;

querying, by the data extractor, the resource description framework specification compliant data source to extract data by executing one or more of the selected predefined resource description framework queries, wherein the one or more selected predefined resource description framework queries have an assigned repetition frequency based on the frequency of change of data to be extracted from the data source or an importance of a timely detection of a change of the data to be extracted from the resource description framework specification compliant data source; and processing the extracted data by the enterprise resource planning system, comprising:

determining whether the extracted data includes new data that is of interest to one or more service consumers; and responsive to determining whether the extracted data includes new data that is of interest to the one or more service consumers, sending an event message alerting the one or more service consumers of the new data.

13. The computer-readable storage medium of claim 12, wherein each query has an assigned schedule of repetition.

14. The computer-readable storage medium of claim 12, wherein the data from the Semantic Web is Extensible Markup Language data.

15. The computer-readable storage medium of claim 12, wherein at least one of the predefined resource description framework queries is performed using an resource description framework data access query language.

16. The computer-readable storage medium of claim 12, wherein the enterprise resource planning system comprises:

a workflow system for performing the data processing operation.

17. The method of claim 1, wherein the identifier of the enterprise resource planning system comprises a unique identifier.

* * * * *